(12) United States Patent
Jones et al.

(10) Patent No.: US 8,282,863 B2
(45) Date of Patent: Oct. 9, 2012

(54) HIGH REFRACTIVE INDEX INORGANIC OXIDE NANOPARTICLES COMPRISING SURFACE TREATMENT, POLYMERIZABLE RESIN, AND ARTICLES

(75) Inventors: Clinton L. Jones, Somerset, WI (US); Brant U. Kolb, Afton, MN (US); Taun L. McKenzie, Hugo, MN (US); David B. Olson, St. Croix, MN (US); Nathan K. Naismith, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 65 days.

(21) Appl. No.: 13/123,054

(22) PCT Filed: Nov. 20, 2009

(86) PCT No.: PCT/US2009/065352
§ 371 (c)(1), (2), (4) Date: Apr. 7, 2011

(87) PCT Pub. No.: WO2010/074862
PCT Pub. Date: Jul. 1, 2010

(65) Prior Publication Data
US 2011/0227008 A1 Sep. 22, 2011

Related U.S. Application Data

(60) Provisional application No. 61/122,706, filed on Dec. 15, 2008.

(51) Int. Cl.
*F21V 9/14* (2006.01)
*G02B 5/30* (2006.01)
*G02C 7/12* (2006.01)
*C07F 7/00* (2006.01)
*C07F 7/28* (2006.01)

(52) U.S. Cl. ........ 252/585; 106/447; 106/450; 106/499; 106/505; 252/301.21; 349/62; 349/96; 428/1.1; 428/1.3; 428/1.51; 428/1.54; 428/1.55; 428/147; 428/148; 428/500; 523/202; 523/210; 524/413; 556/413; 977/773

(58) Field of Classification Search .......... 225/585; 106/447, 450, 499, 505; 349/62, 96; 362/19; 428/195, 206, 64.4, 1.1–1.62, 141, 156, 167, 428/409, 147, 148, 500; 522/81, 83, 173, 522/175, 96, 97; 523/210, 202; 524/413; 526/313; 359/485, 486, 487, 488, 490, 491, 359/492, 493, 494, 495, 496, 497, 498, 837, 359/742, 49, 456, 457, 459, 580–582, 599; 252/301.21, 585; 556/51; 977/773

See application file for complete search history.

(56) References Cited

U.S. PATENT DOCUMENTS

| | | | |
|---|---|---|---|
| 4,576,850 A | 3/1986 | Martens | |
| 5,175,030 A | 12/1992 | Lu | |
| 5,183,597 A | 2/1993 | Lu | |
| 5,424,365 A * | 6/1995 | Elmore et al. | 525/208 |
| 5,783,120 A | 7/1998 | Ouderkirk | |
| 5,825,543 A | 10/1998 | Ouderkirk | |
| 5,828,488 A | 10/1998 | Ouderkirk | |
| 5,882,774 A | 3/1999 | Jonza | |
| 6,111,696 A | 8/2000 | Allen | |
| 6,844,950 B2 | 1/2005 | Chisholm | |
| 7,074,463 B2 | 7/2006 | Jones | |
| 7,169,375 B2 | 1/2007 | Chisholm | |
| 7,241,437 B2 | 7/2007 | Davidson | |
| 7,524,543 B2 | 4/2009 | Jones | |
| 2002/0004544 A1 * | 1/2002 | Kolb et al. | 524/413 |
| 2004/0050299 A1 | 3/2004 | Wang | |
| 2004/0063813 A1 | 4/2004 | Wu | |
| 2006/0147674 A1 | 7/2006 | Walker, Jr. | |
| 2006/0204745 A1 | 9/2006 | Jones | |
| 2007/0112097 A1 * | 5/2007 | Olson et al. | 523/210 |
| 2007/0286993 A1 | 12/2007 | Radcliffe | |
| 2007/0286994 A1 | 12/2007 | Walker | |
| 2008/0030829 A1 | 2/2008 | Jones | |
| 2008/0050560 A1 | 2/2008 | Jones | |
| 2008/0221291 A1 * | 9/2008 | Invie et al. | 526/313 |
| 2009/0047486 A1 | 2/2009 | Jones | |
| 2009/0176061 A1 | 7/2009 | Jones | |
| 2010/0276374 A1 | 11/2010 | Kolb | |

FOREIGN PATENT DOCUMENTS

WO  WO 2008/121465  10/2008

OTHER PUBLICATIONS

International Search Report PCT/US2009/065352 Jun. 11, 2010, 6 pages.

* cited by examiner

*Primary Examiner* — Bijan Ahvazi
(74) *Attorney, Agent, or Firm* — Carolyn A. Fischer

(57) ABSTRACT

Microstructured films comprising surface modified inorganic oxide particles, surface modified inorganic nanoparticles having a high refractive index, and polymerizable resins are described.

18 Claims, No Drawings

HIGH REFRACTIVE INDEX INORGANIC OXIDE NANOPARTICLES COMPRISING SURFACE TREATMENT, POLYMERIZABLE RESIN, AND ARTICLES

CROSS REFERENCE TO RELATED APPLICATIONS

This application is a national stage filing under 35 U.S.C. 371 of PCT/US2009/065352, filed Nov. 20, 2009, which claims priority to U.S. Provisional Application No. 61/122,706, filed Dec. 15, 2008, the disclosure of which is incorporated by reference in its entirety herein.

SUMMARY

In some embodiments, surface modified inorganic nanoparticles having a refractive index of at least 1.60 are described. In one embodiment, the nanoparticles are surface modified with a surface treatment comprising a compound comprising a carboxylic acid end group and a $C_3$-$C_8$ ester repeat unit or at least one $C_6$-$C_{16}$ ester unit. In another embodiment, 90 to 100% wt-% of the surface treatment comprises one or more compounds comprising a (meth)acrylate end group and the surface treatment is free of organosilane compounds.

In other embodiments, polymerizable resin compositions are described comprising an organic component and the embodied surface modified inorganic nanoparticles described herein.

In other embodiments, microstructured films are described having a microstructured surface, wherein the microstructures comprise the reaction product of a polymerizable resin composition comprising an organic component and at least 10 wt-% inorganic nanoparticles surface modified with a surface treatment comprising a compound comprising a carboxylic acid end group and a $C_3$-$C_8$ ester repeat unit or at least one $C_6$-$C_{16}$ ester unit.

In each of these embodiments, the surface treatment compound preferably comprises a compound having the general formula:

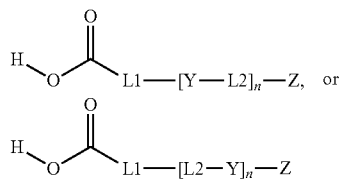

wherein
n averages from 1.1 to 6;
L1 is a $C_1$-$C_8$ alkyl, arylalkyl, or aryl group, optionally substituted with one or more oxygen atoms or an ester group;
L2 is a $C_3$-$C_8$ alkyl, arylalkyl, or aryl group, optionally substituted with one or more oxygen atoms;
Y is

and
Z is an end group comprising a $C_2$-$C_8$ alkyl, ether, ester, alkoxy, (meth)acrylate, or combination thereof.

DETAILED DESCRIPTION OF PREFERRED EMBODIMENTS

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

As described in U.S. Pat. No. 5,183,597 (Lu) and U.S. Pat. No. 5,175,030 (Lu et al.); incorporated herein by reference, a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (e.g. substrate) and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

Presently described are surface modified inorganic oxides nanoparticles, polymerizable resin compositions, and article comprising polymerized structures comprising the reaction product of a polymerizable resin comprising surface modified inorganic nanoparticles dispersed in an organic component. The polymerized structure can be an optical element or optical product constructed of a base substrate layer and an optical layer. The base substrate layer and optical layer are typically formed from different polymer materials.

As used herein "polymerizable composition" refers to the total composition including the organic component and surface modified inorganic nanoparticles. The "organic component" refers to all of the components of the composition except for the surface modified inorganic nanoparticles. Since the surface treatments are generally adsorbed or otherwise attached to the surface of the inorganic nanoparticles, the surface treatments are not considered a portion of the organic component. The wt-% of surface modified inorganic nanoparticles is greater than the concentration of the inorganic nanoparticles alone. It is typical for the wt-% of surface modified nanoparticles to be about 20% greater than the wt-% of the inorganic nanoparticles. For example, a composition comprising 40 wt-% of inorganic nanoparticles comprises about 56 wt-% surface modified inorganic nanoparticles.

The polymerizable resin typically comprises a mixture of ethylenically unsaturated monomers. The mixture typically comprises at least one difunctional aromatic (meth)acrylate monomer and a major amount of a (e.g. aromatic) monofunctional (meth)acrylate monomer. The monofunctional (meth)acrylate monomer typically has a low molecular weight (e.g. less than 450 g/mole) and a refractive index of at least 1.50, 1.51, 1.52, 1.53, 1.54, 1.55, 1.56, 1.57 or 1.58.

Surface modified (e.g. colloidal) nanoparticles are present in the polymerized structure in an amount effective to enhance the durability and/or refractive index of the article or optical element. The total amount of surface modified inorganic nanoparticles can be present in the polymerizable resin or optical article in an amount of at least 10 wt-%, 20 wt-%, 30 wt-% or 40 wt-%. The concentration is typically less than to 70 wt-%, and more typically less than 60 wt-% in order that the polymerizable resin composition has a suitable viscosity for use in cast and cure processes of making microstructured films.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron miscroscopy (TEM). The nanoparticles can include metal oxides such as, for example, alumina, zirconia, titania, mixtures thereof, or mixed oxides thereof. Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol".

The zirconia particles can be prepared using hydrothermal technology as described in U.S. Patent Application Ser. No. 61/017,326 and U.S. Pat. No. 7,241,437; incorporated herein by reference. Once formed, the nanoparticles typically comprise adsorbed volatile acid (i.e. monocarboxylic acids having six or less carbon atoms) such as acetic acid.

Surface modification involves attaching surface modification agents to inorganic oxide (e.g. zirconia) particles to modify the surface characteristics. The overall objective of the surface modification of the inorganic particles is to provide resins with homogeneous components and preferably a low viscosity that can be prepared into films (e.g. using cast and cure processes) with high brightness.

The nanoparticles are often surface-modified to improve compatibility with the organic component. The surface-modified nanoparticles are often non-associated, non-agglomerated, or a combination thereof in the organic component. The resulting light management films that contain these surface-modified nanoparticles tend to have high optical clarity and low haze. The addition of the high refractive index surface-modified nanoparticles, such as zirconia, can increase the gain of brightness enhancement film compared to films that contain only polymerized organic material.

It is surmised that the non-reactive volatile acid (e.g. acetic acid) adsorbed on the surface of the nanoparticles is displaced by various (e.g. non-volatile) carboxylic acid compounds, as described herein. In addition to the use of surface treatments, the (e.g. brightness enhancing film) may also be subjected to additional processes steps (e.g. heat treatment) to reduce the non-reactive volatile acid content. Although, a detectable amount may be present (0.01 wt-% to 0.1 wt-%), the non-reactive volatile acid content of the brightness enhancing film is generally less than 5 wt-%. The total amount of non-volatile acid may range up to 50 wt-%, particularly when the non-volatile acid is reactive with the organic component of the resin and has a sufficiently high refractive index. Typically the non-volatile acid content of the surface modified particles, polymerized resin, or polymerized structure ranges from 1 wt-% to 20 wt-%.

The monocarboxylic acid (i.e., containing one carboxylic acid group per molecule) surface treatments may be represented by the formula A-B where the A group is a monocarboxylic acid group capable of attaching to the surface of a (e.g. zirconia or titania) nanoparticle, and B is a compatibilizing group that comprises a variety of different functionalities. The carboxylic acid group can be attached to the surface by adsorption and/or formation of an ionic bond. The compatibilizing group B is generally chosen such that it is compatible with the polymerizable resin of the (e.g. brightness enhancing) microstructured optical article. The compatibilizing group B can be reactive or nonreactive and can be polar or non-polar.

The compatibilizing group B is preferably reactive such that it can copolymerize with the organic component of the (e.g. brightness enhancing) microstructured optical article. For example, free radically polymerizable groups such as (meth)acrylate compatibilizing groups can copolymerize with (meth)acrylate functional organic monomers to generate brightness enhancement articles with good homogeneity.

The (e.g. zirconia) inorganic nanoparticles described herein are surface modified with a surface treatment comprising a compound comprising a carboxylic acid end group and a $C_3$-$C_8$ ester repeat unit or at least one $C_6$-$C_{16}$ ester unit. It has been found that by employing even a small concentration of a compound having a higher molecular weight ester unit, the optical clarity of the polymerizable resin can be improved. The compound typically has the general formula:

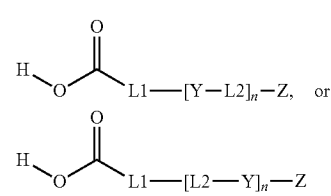

wherein
n averages from 1.1 to 6;
L1 is a $C_1$-$C_8$ alkyl, arylalkyl, or aryl group, optionally substituted with one or more oxygen atoms or an ester group;

L2 is a $C_3$-$C_8$ alkyl, arylalkyl, or aryl group, optionally substituted with one or more oxygen atoms;

Y is

and

Z is an end group comprising a $C_2$-$C_8$ alkyl, ether, ester, alkoxy, (meth)acrylate, or a combination thereof.

In some embodiments, L2 comprises a C6-C8 alkyl group and n averages 1.5 to 2.5. Z preferably comprises a $C_2$-$C_8$ alkyl group. Z preferably comprises a (meth)acrylate end group.

Surface modifiers comprising a carboxylic acid end group and a $C_3$-$C_8$ ester repeat unit can be derived from reacting a hydroxy polycaprolactone such as a hydroxy polycaprolactone (meth)acrylate with an aliphatic or aromatic anhydride. The hydroxy polycaprolactone compounds are typically available as a polymerized mixture having a distribution of molecules. At least a portion of the molecules have a $C_3$-$C_8$ ester repeat unit, i.e. n is at least 2. However, since the mixture also comprises molecules wherein n is 1, the average n for the hydroxy polycaprolactone compound mixture may be 1.1, 1.2, 1.3, 1.4, or 1.5. In some embodiments, n averages 2.0, 2.1, 2.2, 2.3, 2.4 or 2.5.

Suitable hydroxy polycaprolactone (meth)acrylate compounds are commercially available from Cognis under the trade designation "Pemcure 12A" and from Sartomer under the trade designation "SR495" (reported to have a molecular weight of 344 g/mole).

Suitable aliphatic anhydrides include for example maleic anhydride, succinic anhydride, suberic anhydride, and glutaric anhydride. In some embodiments, the aliphatic anhydride is preferably succinic anhydride.

Aromatic anhydrides have a relatively higher refractive index (e.g. RI of at least 1.50). The inclusion of surface treatment compounds such as those derived from aromatic anhydrides can raise the refractive index of the overall polymerizable resin composition. Suitable aromatic anhydrides include for example phthalic anhydride.

Exemplary reaction schemes are depicted as follows:

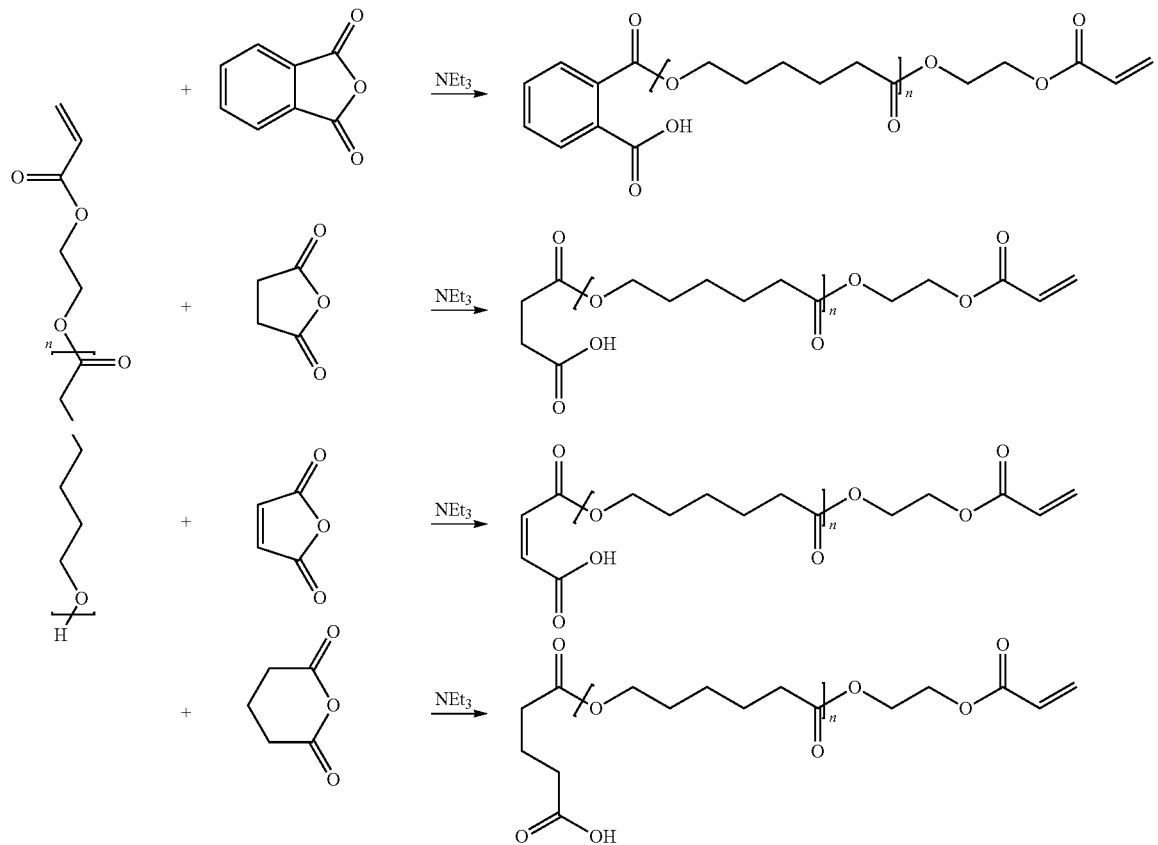

n = 1-6

The compound comprising a carboxylic acid end group and $C_3$-$C_8$ ester repeat unit or at least one $C_6$-$C_{16}$ ester unit, as just described may be the sole surface treatment, being employed at a concentration up to about 50 wt-% of the polymerizable resin composition.

The inorganic nanoparticles preferably comprise a surface treatment comprising a first compound comprising a monocarboxylic acid end group and a C3-C8 ester repeat unit or at least one $C_6$-$C_{16}$ ester unit, as just described in combination with a second compound. In this embodiment the amount of first compound is preferably 0.1 to 5 wt-% of the polymerizable resin in combination with up to 20 wt-% of the second compound.

The second surface treatment preferably comprises another compound comprising a (e.g. non-volatile) monocarboxylic acid end group and a compatibilizing group having a reactive group such as a (meth)acrylate end group that copolymerizes with the organic component. The surface treatment preferably comprises a combination of compounds employed in amounts such that the nanoparticles comprise a major amount of (e.g. (meth)acrylate functional) compounds that reacts with the organic component of the polymerizable resin. The stoichiometric amount of reactive compounds of the surface treatments relative to non-reactive compounds is typically at least 1:1 or 2:1 or 3:1 or 4:1 or 5:1. In some preferred embodiments, the stoichiometric amount of reactive compounds of the surface treatments relative to non-reactive compounds is at least 6:1 or 7:1 or 8:1 or 9:1 or greater. The surface treatment can comprise 85 wt-% to 100 wt-% of one or more reactive compounds, each having a monocarboxylic acid end group in combination with a (meth)acrylate end group.

In one embodiment, the second surface treatment is preferably a (meth)acrylate functionalized compound prepared by the reaction of an aliphatic or aromatic anhydride as previously described and a hydroxyl (e.g. $C_2$-$C_8$) alkyl (meth)acrylate.

Examples of surface modification agents of this type are succinic acid mono-(2-acryloyloxy-ethyl) ester, maleic acid mono-(2-acryloyloxy-ethyl) ester, and glutaric acid mono-(2-acryloyloxy-ethyl) ester, maleic acid mono-(4-acryloyloxy-butyl) ester, succinic acid mono-(4-acryloyloxy-butyl) ester, and glutaric acid mono-(4-acryloyloxy-butyl) ester. These species are shown in WO2008/121465; incorporated herein by reference. Other aliphatic surface modifiers of this type include mono(meth)acryloxypolyethyleneglycol succinate, or analogous materials made from maleic or glutaric anhydride.

Other surface treatment compounds can be prepared from aromatic anhydrides. Examples of such molecules are phthalic acid mono-(2-acryloyloxy-ethyl) ester and phthalic acid mono-(2-acryloyloxy-butyl) ester, which can be prepared starting with phthalic anhydride as depicted in WO2008/121465. Another reactive surface modifier is beta-carboxylethyl acrylate.

In some embodiments, the first compound comprising a monocarboxylic acid end group and a C3-C8 ester repeat unit or at least one $C_6$-$C_{16}$ ester unit is employed in combination with a second compound comprising a monocarboxylic acid end group and a non-reactive compatibilizing group. By "non-reactive" it is meant that the compatibilizing group does not react with the organic component.

One example is a monocarboxylic acid compound comprising a (e.g. polyether group) water soluble tail. Such surface treatment can impart polar character to the zirconia or titania particles.

The polyether tail comprises repeating difunctional alkoxy radicals having the general formula —O—R—. Preferred R groups have the general formula —$C_nH_{2n}$— and include, for example, methylene, ethylene and propylene (including n-propylene and i-propylene) or a combination thereof. Combinations of R groups may be provided, for example, as random, or block type copolymers.

A preferred class of monocarboxylic acids having a polyether tail may be represented generally by the following formula:

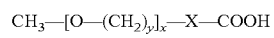

wherein
X is a divalent organic linking group;
x ranges from about 1-10; and
y ranges from about 1-4.
Representative examples of X include —$X_2$—$(CH_2)_n$— where $X_2$ is —O—, —S—, —C(O)O—, —C(O)NH— and wherein n ranges from about 1-3.

Examples of polyether carboxylic acids include 2-[2-(2-methoxyethoxy)ethoxy]acetic acid having the chemical structure $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA). MEAA and MEEAA are commercially from Aldrich Chemical Co., Milwaukee, Wis. as catalog numbers 40, 701-1 and 40, 700-3, respectively.

Other surface modifiers with polyether compatibilizing tails include those generally prepared by the reaction of an aliphatic anhydride and a polyalkylene oxide monoether. Surface modifiers of this type include succinic acid mono-[2-(2-methoxy-ethoxy)-ethyl]ester, maleic acid mono-[2-(2-methoxy-ethoxy)-ethyl]ester, and glutaric acid mono-[2-(2-methoxy-ethoxy)-ethyl]ester. These molecules are depicted in WO2008/121465. Mixtures of two or more polyether carboxylic acids can also be employed.

In other aspects, the first compound comprising a monocarboxylic acid end group and a $C_3$-$C_8$ ester repeat unit or at least one $C_6$-$C_{16}$ ester unit is employed in combination with a compatibilizer having a relatively high refractive index (e.g. RI is at least 1.50). Compatibilizers containing one or more aromatic groups, such as phthalate groups, advantageously have a high refractive index and thus the inclusion of such can raise the refractive index of the overall polymerizable composition. Other methods of raising the refractive index include the inclusion of sulfur or bromine atoms into the surface modifier molecules.

Various phthalate based material can be produced by the reaction schemes shown in WO2008/121465; including for example, phthalic acid mono-(2-phenyl sulfonyl-ethyl)ester, example phthalic acid mono-(2-phenoxy-ethyl)ester, and phthalic acid mono-[2-(2-methoxy-ethoxy)-ethyl]ester.

In addition, the surface treatment may additionally comprise at least one mono or dicarboxylic acid. Representative examples include acrylic acid methacrylic acid, as well as various dicarboxylic acids. The dicarboxylic acids are preferably relatively low in molecular weight. The dicarboxylic acid may be linear or branched. These include for example maleic acid, succinic acid, suberic acid, phthalic acid, and itaconic acid.

The surface modification of the particles in the colloidal dispersion can be accomplished in a variety of ways. The process generally involves the mixture of an inorganic particle dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone.

The co-solvent can enhance the solubility of the surface modifying agents as well as the surface modified particles. The mixture comprising the inorganic sol and surface modifying agents is subsequently reacted at room or an elevated temperature, with or without mixing.

The surface modified particles can then be incorporated into the curable (i.e. polymerizable) resin compositions in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The organic component as well as the polymerizable composition is preferably substantially solvent free. "Substantially solvent free" refer to the polymerizable composition having less than 5 wt-%, 4 wt-%, 3 wt-%, 2 wt-%, 1 wt-% and 0.5 wt-% of (e.g. organic) solvent. The concentration of solvent can be determined by known methods, such as gas chromatography. Solvent concentrations of less than 0.5 wt-% are preferred.

The components of the organic component are preferably chosen such that the organic component has a low viscosity. Typically the viscosity of the organic component is substantially lower than the organic component of compositions previously employed. The viscosity of the organic component is less than 1000 cps and typically less than 900 cps. The viscosity of the organic component may be less than 800 cps, less than 700 cps, less than 600 cps, or less than 500 cps at the coating temperature. As used herein, viscosity is measured (at a shear rate up to 1000 sec-1) with 25 mm parallel plates using a Dynamic Stress Rheometer. Further, the viscosity of the organic component is typically at least 10 cps, more typically at least 50 cps, even more typically at least 100 cps, and most typically at least 200 cps at the coating temperature.

The coating temperature typically ranges from ambient temperature, (i.e. 25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point in the polymerizable composition is less than the coating temperature. The organic component can be a liquid at ambient temperature.

The organic component as well as the polymerizable composition has refractive index of at least 1.47, for most product applications; whereas the polymerizable resin composition of a turning film may have a refractive index as low as 1.44. The refractive index of the organic component or the polymerizable composition may be at least 1.48, 1.49, 1.50, 1.51, 1.52, 1.53, 1.54, 1.55, 1.56, 1.57, 1.58, 1.59, or 1.60. The polymerizable composition including the nanoparticles can have a refractive index as high as 1.70. (e.g. at least 1.61, 1.62, 1.63, 1.64, 1.65, 1.66, 1.67, 1.68, or 1.69) High transmittance in the visible light spectrum is also typically preferred.

The polymerizable composition is energy curable in time scales preferably less than five minutes (e.g. for a brightness enhancing film having a 75 micron thickness). The polymerizable composition is preferably sufficiently crosslinked to provide a glass transition temperature that is typically greater than 45° C. The glass transition temperature can be measured by methods known in the art, such as Differential Scanning calorimetry (DSC), modulated DSC, or Dynamic Mechanical Analysis. The polymerizable composition can be polymerized by conventional free radical polymerization methods.

In some embodiments, the organic component preferably comprises one or more (e.g. monofunctional) biphenyl monomer(s) in combination with at least one aromatic (meth)acrylate monomer having two or more (meth)acrylate groups.

Monofunctional biphenyl monomers comprise a terminal biphenyl group (wherein the two phenyl groups are not fused, but joined by a bond) or a terminal group comprising two aromatic groups joined by a linking group (e.g. Q). For example, when the linking group is methane, the terminal group is a biphenylmethane group. Alternatively, wherein the linking group is —(C(CH$_3$)$_2$—, the terminal group is 4-cumyl phenyl. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group or single thio(meth)acrylate group. Acrylate functionality is typically preferred. In some aspects, the biphenyl group is joined directly to the ethylenically unsaturated (e.g. (meth)acrylate) group. An exemplary monomer of this type is 2-phenyl-phenyl acrylate. The biphenyl mono(meth)acrylate or biphenyl thio(meth)acrylate monomer may further comprise a (e.g. 1 to 5 carbon) alkyl group optionally substituted with one or more hydroxyl groups. An exemplary species of this type is 2-phenyl-2-phenoxyethyl acrylate.

The organic component may include a single biphenyl (meth)acrylate monomer or a combination of two or more biphenyl (meth)acrylate monomers. The total amount of such biphenyl monomers is generally at least 10 wt-%, 15 wt-%, 20 wt-% or 25 wt-% of the organic component. The total amount of monofunctional biphenyl monomers is no greater than 90 wt-%, and more typically no greater than about 75 wt-% (e.g. less than 70 wt-%, 65 wt-%, 60 wt-%). In some embodiments, the total amount of biphenyl monomer(s) ranges from 30 wt-% to 50 wt-% of the organic component.

In one embodiment, a monofunctional biphenyl (meth) acrylate monomer is employed having the general formula:

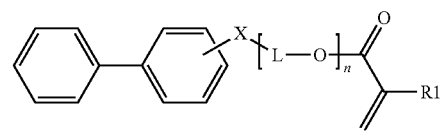

wherein R1 is H or CH$_3$;

X is O or S;

n ranges from 0 to 10 (e.g. n is 1, 2, 3, 4, 5, 6, 7, 8, 9, or 10); and

L is an alkyl group having 1 to 5 carbon atoms (i.e. methyl, ethyl, propyl, butyl, or pentyl), optionally substituted with hydroxy.

In another embodiment, the monofunctional biphenyl (meth)acrylate monomer has the general formula:

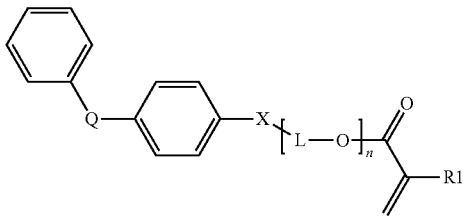

wherein R1 is H or CH$_3$;

X is O or S;

Q is selected from —(C(CH$_3$)$_2$—, —CH$_2$, —C(O)—, —S(O)—, and —S(O)$_2$—;

n ranges from 0 to 10 (e.g. n is 1, 2, 3, 4, 5, 6, 7, 8, 9, or 10); and

L is an alkyl group having 1 to 5 carbon atoms (i.e. methyl, ethyl, butyl, or pentyl), optionally substituted with hydroxy.

Some specific monomers that are commercially available from Toagosei Co. Ltd. of Japan, include for example 2-phenyl-phenyl acrylate available under the trade designation "TO-2344", 4-(-2-phenyl-2-propyl)phenyl acrylate available under the trade designation "TO-2345", and 2-phenyl-2-phenoxyethyl acrylate, available under the trade designation "TO-1463".

The inclusion of monofunctional biphenyl (e.g. (meth) acrylate) monomers can concurrently raise the refractive index of the organic component and improve the processability of the polymerizable composition by reducing the viscosity. These monomers are particularly advantageous when relatively high (i.e. greater than 25 wt-%) concentrations of (e.g. lower refractive index) difunctional (meth)acrylate monomers or oligomers are employed.

The organic component preferably comprises at least 5 wt-% and typically no greater than about 80 wt-% of a difunctional (meth)acrylate monomer or oligomer.

Suitable difunctional urethane (meth)acrylates are commercially available from Sartomer under the trade designations "CN965", "CN968", "CN981", "CN 983", "CN 984", "CN972", and "CN978"; from Cognis under the trade designation "Photomer 6210", "Photomer 6217", "Photomer 6230", "Photomer 6623", "Photomer 6891", and "Photomer 6892"; and from UCB under the trade designations "Ebecryl 1290", "Ebecryl 2001", and "Ebecryl 4842".

Suitable difunctional polyester (meth)acrylates are commercially available from Sartomer under the trade designation "CN292"; from Cognis under the trade designation "Photomer 5010", "Photomer 5429", "Photomer 5430", "Photomer 5432", "Photomer 5662", "Photomer 5806", and "Photomer 5920"; and from UCB under the trade designations "Ebecryl 80", "Ebecryl 81", "Ebecryl 83", "Ebecryl 450", "Ebecryl 524", "Ebecryl 525", "Ebecryl 585", "Ebecryl 588", "Ebecryl 810", and "Ebecryl 2047".

Suitable (meth)acrylated acrylic oligomers are also commercially available or can be prepared by methods know in the art.

The polymerizable composition may comprise an aromatic difunctional (meth)acrylate monomer that comprises a major portion having the following general structure:

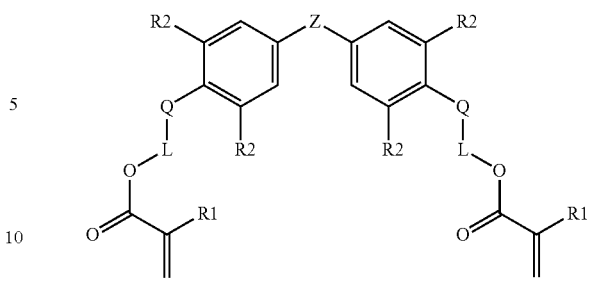

wherein each R1 is independently hydrogen or methyl. Each R2 is independently hydrogen or bromine. Each Z is independently —C(CH$_3$)$_2$—, —CH$_2$—, —C(O)—, —S—, —S(O)—, or —S(O)$_2$—, and each Q is independently O or S. In some embodiments Z is preferably —C(CH$_3$)$_2$— and Q is preferably O. Typically, the R1 groups are the same. Typically, the R2 groups are the same as each other well. L is a linking group. L may independently comprise a branched or linear C$_2$-C$_{12}$ alkyl group (i.e. C$_2$, C$_3$, C$_4$, C$_5$, C$_6$, C$_7$, C$_8$, C$_9$, C$_{10}$, C$_{11}$, or C$_{12}$). The carbon chain of the alkyl group may optionally be substituted with one or more oxygen groups. Further, the carbon atoms of the alkyl group may optionally be substituted with one or more hydroxyl groups. For example L may be —CH$_2$CH(OH)CH$_2$—. Typically, the linking groups are the same. In one embodiment, the alkyl group is C$_{10}$. In another embodiment, the alkyl group comprises no more than 8 carbon atoms no more than 6 carbon atoms, or no more than 4 carbon atoms.

The di(meth)acrylate monomer may be synthesized or purchased. As used herein, major portion refers to at least 60-70 wt-% of the monomer containing the specific structure(s) just described. It is commonly appreciated that other reaction products are also typically present as a byproduct of the synthesis of such monomers.

The di(meth)acrylate monomer can be the reaction product of Tetrabromobisphenol A diglycidyl ether and acrylic acid. The first monomer may be obtained from UCB Corporation, Smyrna, Ga. under the trade designation "RDX-51027". This material comprises a major portion of 2-propenoic acid, (1-methylethylidene)bis[(2,6-dibromo-4,1-phenylene)oxy (2-hydroxy-3,1-propanediyl)] ester.

Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", "CN115" and "CN112C60". (Meth)acrylated aromatic epoxy oligomer, (described as an epoxy acrylate oligomer), is available from Sartomer under the trade designation "CN2204". Further, an (meth)acrylated aromatic epoxy oligomer, (described as an epoxy novolak acrylate blended with 40% trimethylolpropane triacrylate), is available from Sartomer under the trade designation "CN112C60".

In some embodiments, the aromatic epoxy acrylate is derived from bisphenol A, such as those of the structure previously described. In other embodiments, the aromatic epoxy acrylates is derived from a different monomer than bisphenol A.

One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

The organic component optionally comprises up to about 50 wt-% (e.g. any amount ranging from 0 to 50) reactive diluents (i.e. other than the monofunctional biphenyl monomer(s). Reactive diluents are mono-ethylenically unsaturated monomers such as (meth)acrylates or monomeric N-substituted or N,N-disubstituted (meth)acrylamides, especially an acrylamide. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

Diluents can have a refractive index greater than 1.50 (e.g. greater than 1.55). Such reactive diluents can be halogenated or non-halogenated (e.g. non-brominated). One exemplary high index optional monomer is 2,4,6-tribromophenoxyethyl (meth)acrylate commercially available from Daiichi Kogyo Seiyaku Co. Ltd (Kyoto, Japan) under the trade designation "BR-31".

Suitable reactive diluents include for example phenoxy ethyl (meth)acrylate; phenoxy-2-methylethyl (meth)acrylate; phenoxyethoxyethyl (meth)acrylate, 3-hydroxy-2-hydroxypropyl (meth)acrylate; benzyl (meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

The biphenyl (meth)acrylate monomer(s) are typically employed in combination with (e.g. up to 25 wt-% of) a monofunctional reactive diluent(s) having a lower refractive index than the biphenyl monomer(s).

A preferred diluent is phenoxyethyl (meth)acrylate, and in particular phenoxyethyl acrylate (PEA). Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Benzyl acrylate is commercially available from AlfaAeser Corp, Ward Hill, Mass.

The organic component may optionally comprise a crosslinker that comprises at least three (meth)acrylate groups. In some embodiments, crosslinker may be present in the polymerizable composition in an amount of at least about 2 wt-%. Typically, the amount of crosslinking agent is not greater than about 25 wt-%. The crosslinking agent may be present in any amount ranging from about 5 wt-% and about 15 wt-%.

In some embodiments, the organic component comprises less than 5 wt-% crosslinker or is substantially free of crosslinker.

In some embodiments, it is preferred that the polymerizable resin composition is substantially free (i.e. contain less than 1 wt-%) of bromine. In other embodiments, the total amount of bromine in combination with chlorine is less than 1 wt-%. In some aspects, the polymerizable resin composition is substantially non-halogenated (i.e. contains less than 1 wt-% total of bromine, chlorine, fluorine and iodine).

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoybiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in U.S. Pat. No. 7,074,463. The micro-structured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 to 15 micrometers.

These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed component suspended or dispersed in a continuous phase.

For some optical products such as microstructure-bearing products such as, for example, brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microtine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696.

A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

The tensile strength and elongation can be tested according to ASTM D 882-02 using the specified test specimen preparation and testing parameters described in WO2008/121465.

The polymerizable resin compositions suitable for use in making the polymerized structure of a brightness enhancing film described herein have a tensile strength at break of at least 25 MPa, 30 MPa, 35 MPa, 40 MPa, 45 MPa, or 50 MPa. The tensile strength at break typically does not exceed about 200 MPa. In some embodiments, the tensile strength is at least 55 MPa or 60 MPa. The polymerizable resin compositions also have an elongation at break of at least 1.75% or 2%. In some embodiments, the elongation is at least 2.5%, 3%, 3.5%, 4%, 4.5%, 5%, 5.5%, 6.0%, 6.5%, 7.0%, 7.5%, or 8%. The elongation is typically less than 20% and is some embodiments no greater than 15%.

The polymerizable resin compositions typically have a glass transition temperature (Tg) of at least 35° C., 40° C., or 45° C. The inclusion of the surface modified nanoparticles can raise the Tg of the polymerizable resin composition. Thus, the organic component can have a lower Tg than the (i.e. nanoparticle-containing) polymerizable resin composition. The dynamic tensile modulus of the polymerizable resin composition is typically at least $1 \times 10^9$ at about 20° C.

By utilizing the polymerizable resin compositions described herein, the resulting brightness enhancing film can exhibit crack resistance as measured according to a cylindrical mandrel bend test ISO 1519:2002(E). Depending on the thickness of the base substrate, the mandrel size to failure (i.e. the mandrel size that results in cracking of the polymerized structures of the brightness enhancing) is less than 6 mm, 5 mm, or 4 mm. In some embodiments, no cracking is evident with a mandrel size of 3 mm or 2 mm.

An equivalent failing mandrel for microstructured films having a preformed base film of different thicknesses by solving the equation for D when $\epsilon_{surface}$ equals 0.025. Hence, D=1000(T/0.025−T) as described in WO2008/121465.

For the following defined terms, these definitions shall be applied, unless a different definition is given in the claims or elsewhere in this specification.

"Microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective prismatic sheeting, microstructured molds (e.g. for molding paste to prepare barrier ribs), linear Fresnel lenses, video discs, light-collimating privacy films, and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using a Bausch and Lomb Refractometer (CAT No. 33.46.10). It is generally appreciated that the measured index of refraction can vary to some extent depending on the instrument.

"(Meth)acrylate" refers to both acrylate and methacrylate compounds.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

"Aggregation" refers to a strong association between primary particles that may be chemically bound to one another. The breakdown of aggregates into smaller particles is difficult to achieve.

"Agglomeration refers to a weak association between primary particles which my be held together by charge or polarity and can be broken down into smaller entities.

"Primary particle size" refers to the mean diameter of a single (non-aggregate, non-agglomerate) particle.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

1. Gain Test Method

Optical performance of the films was measured using a SpectraScan™ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m$^2$. The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources. When the relative gain of film assemblies containing a reflective polarizer was tested, the pass axis of the reflective polarizer was aligned with the pass axis of the absorbing polarizer of the test system. Relative gain values reported for prismatic films were generally obtained with the prism grooves of the film nearest the absorbing polarizer being aligned perpendicular to the pass axis of the absorbing polarizer.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

Sphere brightness ratio=1/(1−$R$sphere*$R$standard)

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

Sphere brightness ratio=1/(1−$R$sphere*$R$sample)

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

The single sheet gain is tested in the vertical (or perpendicular orientation relative to the front face of the diffuser boxed used in the E.T. Tester). In the horizontal, or crossed sheet configuration, the bottom sheet of the film stack is in the vertical orientation and the top sheet is horizontal or parallel to the front face of the diffuser box.

2. Bend Test (cylindrical mandrel) as described in ISO 1519 was used to measure the crack resistance of the brightness enhancing films, reporting the mandrel size at failure. The bend testing was conducted with the prisms axis parallel to the mandrel axis and the prisms facing away from the mandrel. The prism films were bent over mandrels of various diameters. If the film is not sufficiently flexible, this bending initiates a crack that is not typically visibly evident. The film samples were then aged (unbent) for 16 hours at 60° C. in a batch oven. If a crack was initiated from bending, aging typically causes the crack to propagate and become visibly apparent. The film was then inspected for cracking while being illuminated with a backlight. The average of at least three samples is reported. It has been found that bending the film with the prisms axis parallel to the mandrel is more severe of a test than bending the film while the prisms are perpendicular to the mandrel. Hence, when a film passes this testing condition, it will also pass when the prisms are perpendicular to the mandrel.

$ZrO_2$ Sols

The $ZrO_2$ sols used in the examples had the following properties (as measured according to the methods described in U.S. Pat. No. 7,241,437.

| Relative Intensities | | Apparent Crystallite Size (nm) | | | | | |
|---|---|---|---|---|---|---|---|
| Cubic/ Tetragonal | Monoclinic | (C, T) (1 1 1) | M (−1 1 1) | M (1 1 1) | Avg M Size | % C/T | Weighted Avg XRD Size |
| 100 | 6-12 | 7.0-8.5 | 3.0-6.0 | 4.0-11.0 | 4.5-8.3 | 89%-94% | 7.0-8.4 |

% C/T = Primary particle size

Example 1

Preparation of Surface Treatment

A three neck round bottom flask is equipped with a temperature probe, mechanical stirrer and a condenser. To the flask is charged the following reagents: 83.5 g succinic anhydride, 0.04 g Prostab 5198 inhibitor, 0.5 g triethylamine, 87.2 g 2-hydroxyethyl acrylate, and 28.7 g hydroxy-polycaprolactone acrylate from Sartomer under the trade designation "SR495" (n average about 2). The flask is mixed with medium agitation and heated to 80° C. and held for ~6 hours. After cooling to 40° C., 200 g of 1-methoxy-2-propanol was added and the flask mixed for 1 hour. The reaction mixture was determined to be a mixture of the reaction product of succinic anhydride and 2-hydroxyethyl acrylate (i.e. the second compound) and the reaction product of succinic anhydride and hydroxy-polycaprolactone acrylate (i.e. the compound having a $C_3$-$C_8$ ester repeat unit) at a 81.5/18.5 by weight ratio according to infrared and gas chromatography analysis.

Reaction Scheme for Preparation of Surface Treatment

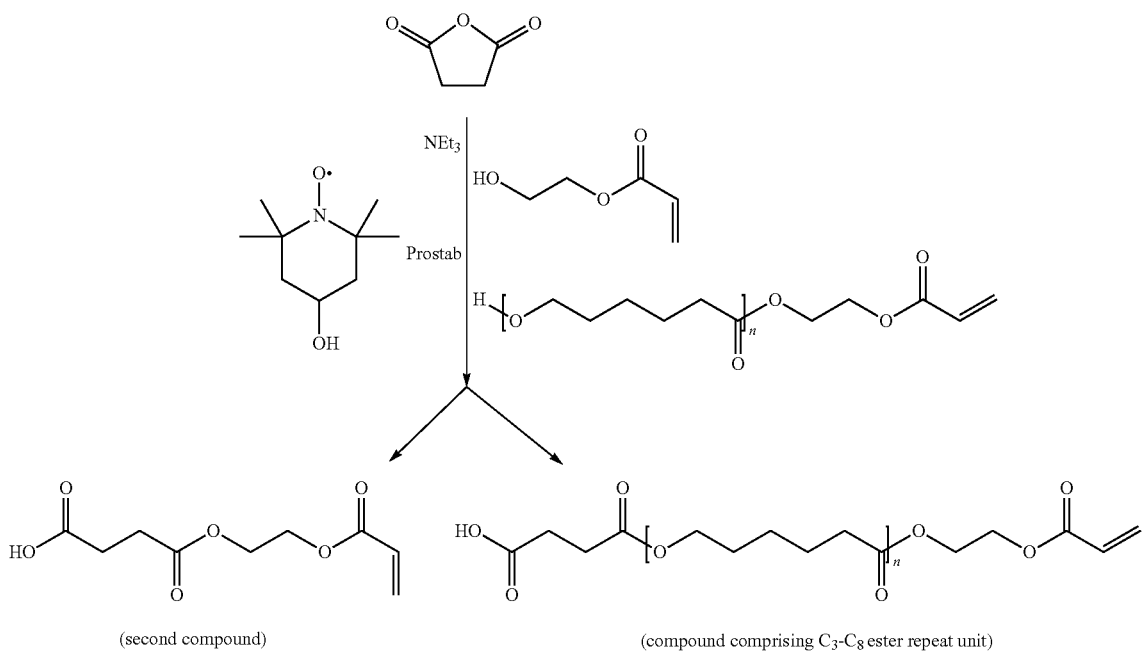

(second compound)  (compound comprising $C_3$-$C_8$ ester repeat unit)

n = ~2

Preparation of the Polymerizable Resin Compositions

Example 2

ZrO$_2$ sol (40.86 wt-% ZrO$_2$), surface treatment of Example 1, a 50/30/20 wt-% blend of 2-phenyl-phenyl acrylate/PEA/SR601, and ProStab 5198 were combined in a similar fashion as in Ex. 1. To this blend, 1-methoxy-2-propanol was added in an amount at least equal to 100 wt-% of the water content of the mix. Water and alcohol were removed via vacuum distillation such that the resultant composite resin dispersion was approximately:
13.4 parts Surface Treatment of Example 1
0.005 parts Prostab5198
12.0 parts PEA
8.0 parts SR601
20.0 parts 2-phenyl-phenyl acrylate
46.0 parts ZrO$_2$
0.36 wt % of Darocure 1173 photoinitiator added to the stripped composite resin
0.40 wt % of Lucirin TPO photoinitiator was added to the stripped composite resin The refractive index of the final blend was measured at 1.624 using a Bausch and Lomb Refractometer (CAT No. 33.46.10). The viscosity was reported at 300 cP at 48° C. using a AR 2000 rheometer available from TA Instruments (New Castle, Del.) equipped with 0° 40 mm parallel plates, a gap of 500 microns and a shear rate of 1000 s$^{-1}$.

Example 3

ZrO$_2$ sol (130 g of 40.8 wt-% ZrO$_2$), methoxy propanol (56 g), surface treatment of Example 1 (30.4 g @ 50% solids in methoxy propanol, a 50/30/20 blend of 2-phenyl-phenyl acrylate (32.6 g @ 46% solids in ethyl acetate)/PEA (8.99 g)/SR601 (5.99 g) and ProStab 5198 (0.02 g) were charged to a 3 neck 1 L RB flask. Water and solvents were removed via vacuum distillation such that the resultant dispersion was approximately 54% ZrO$_2$ in acrylate resin. 0.2% wt. Lucirin TPO and 0.36% Darocure 1173 were added to the acrylate resin. The final mixture had an index of refraction of 1.652 and a viscosity of 1922 cP at 60 deg. C.

Control

ZrO$_2$ sol (40.86 wt-% ZrO$_2$), a 50/30/20 wt-% blend of 2-phenyl-phenyl acrylate/PEA/SR601, and ProStab 5198 were combined in a similar fashion as in Ex. 1 (previous example sent). To this blend, 1-methoxy-2-propanol was added in an amount at least equal to 100 wt-% of the water content of the mix. Water and alcohol were removed via vacuum distillation such that the resultant composite resin dispersion was approximately:
4.86 parts succinic acid mono-[2-(2-methoxy-ethoxy)-ethyl] ester
0.005 parts Prostab5198
7.16 parts succinic acid mono-(2-acryloyloxy-ethyl) ester
12.59 parts PEA
8.40 parts SR601
20.99 parts 2-phenyl-phenyl acrylate
46.00 parts ZrO$_2$
0.36 wt % of Darocure 1173 photoinitiator added to the stripped composite resin
0.20 wt % of Lucirin TPO photoinitiator was added to the stripped composite resin The refractive index of the final blend was measured at 1.625 using a Bausch and Lomb Refractometer (CAT No. 33.46.10). The viscosity was reported at 584 cP at 25° C. using a AR 2000 rheometer available from TA Instruments (New Castle, Del.) equipped with 0° 40 mm parallel plates, a gap of 500 microns and a shear rate of 1000 s$^{-1}$.

Microstructure Brightness Enhancing Film Preparation

The polymerizable resin compositions of Example 2 and the Control (i.e. Control A) were prepared into brightness enhancing films. An 8"×11" metal master consisting of linear rows of 90 degree prisms with a nominal pitch spacing of 50 microns, similar to the prism geometry pattern found on Vikuiti TBEF (commercially available from 3M Co., St. Paul, Minn.), can be placed on a hot plate and heated to 140° F. A 4 ml bead of each of the polymerizable resins can be separately applied to the master tool using a disposable pipette. Next, a 5 mil PET available from Dupont Teijin Films under the trade designation "Melinex 623" can be placed on the bead of resin and master tool. The PET film was oriented so the linear prisms are oriented approximately perpendicular (90°+/−20°) to the high gain axis of the film. The master tool, resin and PET can then be passed through a heated nip roll at 160° F. with sufficient force for the resin to fill the master tool completely, while eliminating any entrained air. The filled master tool can then be exposed to ultraviolet radiation from a "D-bulb" using a 600 W/in. variable power supply available from Fusion UV Systems, Inc. Gaithersburg, Md. at a linespeed of 50 fpm for two passes. The microstructured film can then manually be removed from the master tool. The microstructured prismatic layer formed on the base substrate had a thickness of approximately 25 microns.

Examples 4 and 5

Polymerizable Resin Composition Example 2 and the Control were made into two other brightness enhancing films.

For Example 4 and Control B, the prism geometry pattern found on Vikuiti TBEF (commercially available from 3M Co., St. Paul, Minn.) was employed in combination with a 2 mil PET available from Dupont Teijin Films as the base substrate. The microstructured prismatic layer formed on the base substrate had a thickness of approximately 13 microns.

For Example 5 and Control C, a nominally 80 micron DBEF reflective polarizer similar to that available as the base substrate of Vikuiti BEF-RP (commercially available from 3M Co., St. Paul, Minn.) was used as the base substrate. The microstructured prismatic layer formed on the base substrate had a thickness of approximately 13 microns.

Bend Test Results

| Polymerizable Resin Composition | Mandrel Size (mm) | Crack Rating | Single Sheet Gain |
| --- | --- | --- | --- |
| Control A | 6 | Pass | 1.77 |
| Example 2 | 6 | Pass | 1.78 |
| Control B | 2 | Pass | |
| Example 4 | 2 | Pass | 1.70 |
| Control C | 2 | Pass | |
| Example 5 | 2 | Pass | 2.54 |

What is claimed is:

1. A microstructured film having a microstructured surface, wherein the microstructures comprise the reaction product of a polymerizable resin composition comprising an organic component and at least 10 wt. % of inorganic nanoparticles surface modified with a surface treatment comprising a compound comprising a carboxylic acid end group and a $C_3$-$C_8$ ester repeat unit having the general formula:

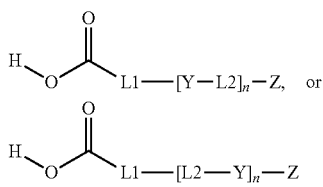

wherein n averages from 1.1 to 6;

L1 is a $C_1$-$C_8$ alkyl, arylalkyl, or aryl group, optionally substituted with one or more oxygen atoms or an ester group;

L2 is a $C_3$-$C_8$ alkyl, arylalkyl, or aryl group, optionally substituted with one or more oxygen atoms;

Y is

and

Z is an end group comprising a $C_2$-$C_8$ alkyl, ether, ester, alkoxy, (meth)acrylate, or combination thereof.

2. The microstructured film of claim 1, wherein L2 is a $C_6$-$C_8$ alkyl group.

3. The microstructured film of claim 1, wherein n averages 1.5 to 2.5.

4. The microstructured film of claim 1, wherein Z comprises a $C_2$-$C_8$ alkyl group.

5. The microstructured film of claim 1, wherein Z comprises a (meth)acrylate end group.

6. The microstructured film of claim 1, wherein the surface treatment comprises the reaction product of i) at least one aliphatic anhydride, and ii) at least one hydroxy polycaprolactone (meth)acrylate.

7. The microstructured film of claim 1, wherein the surface treatment further comprises a second compound comprising a (meth)acrylate end group.

8. The microstructured film of claim 7, wherein the second compound is prepared by the reaction of an aliphatic anhydride and a hydroxyl $C_2$-$C_8$ alkyl(meth)acrylate.

9. The microstructured film of claim 1, wherein the film has a mandrel size to failure of less than 6 mm.

10. The microstructured film of claim 1, wherein the polymerizable resin composition has a refractive index of at least 1.61.

11. The microstructured film of claim 1, wherein the polymerizable resin composition has a refractive index of at least 1.650.

12. The microstructured film of claim 1, wherein the organic component comprises at least one biphenyl monomer.

13. The microstructured film of claim 12, wherein the organic component further comprises at least one difunctional ethylenically unsaturated aromatic monomer.

14. The microstructured film of claim 12, wherein the organic component further comprises one or more monofunctional (meth)acrylate monomers having a refractive index lower than the biphenyl monomer.

15. The microstructured film of claim 1, wherein the amount of inorganic nanoparticles ranges from 40 wt. % to 60 wt. %.

16. The microstructured film of claim 15, wherein the inorganic nanoparticles comprise zirconia.

17. The microstructured film of claim 1, wherein the film is a brightness enhancing film.

18. The microstructured film of claim 1, wherein the film is a polarizing film.

* * * * *

UNITED STATES PATENT AND TRADEMARK OFFICE
CERTIFICATE OF CORRECTION

PATENT NO.        : 8,282,863 B2
APPLICATION NO.   : 13/123054
DATED             : October 9, 2012
INVENTOR(S)       : Clinton L Jones It is certified that error appears in the above-identified patent and that said Letters Patent is hereby corrected as shown below:

Column 3
Line 28-29, Delete "miscroscopy" and insert -- microscopy --, therefor.

Column 5
Line 27,

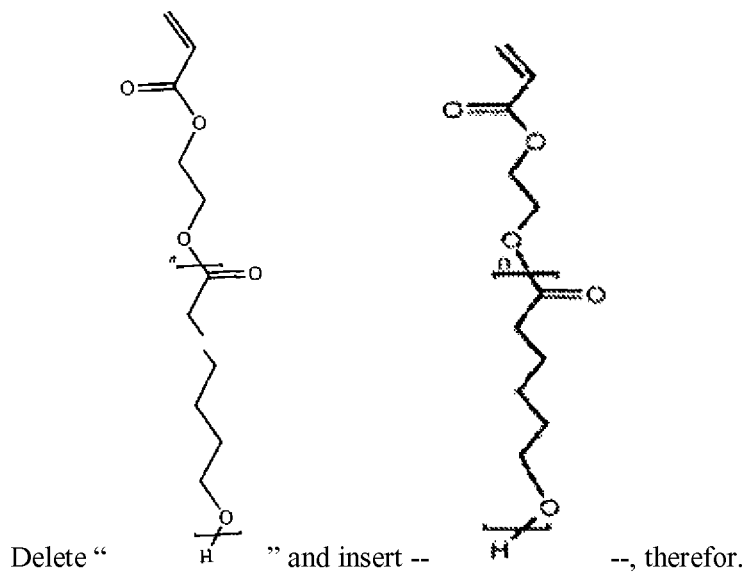

Delete "[structure]" and insert -- [structure] --, therefor.

Column 10
Line 10, Delete "calorimetry" and insert -- Calorimetry --, therefor.

Column 12
Line 54, Delete "novolak" and insert -- novolac --, therefor.

Signed and Sealed this
Nineteenth Day of March, 2013

Teresa Stanek Rea
*Acting Director of the United States Patent and Trademark Office*

CERTIFICATE OF CORRECTION (continued)
U.S. Pat. No. 8,282,863 B2

Column 14
Line 12-13, Delete "trimethylbenzoybiphenylphosphine" and insert
-- trimethylbenzoylbiphenylphosphine --, therefor.

Column 15
Line 41, Delete "microtine" and insert -- microfine --, therefor.

Column 16
Line 25, Delete "$\varepsilon_{surface}$" and insert -- $\varepsilon_{surface}$ --, therefor.
Line 47, Delete "+/-0.005+/-0.1" and insert -- +/-0.005 to +/-0.1 --, therefor.

Column 17
Line 32, Delete "my be" and insert -- may be --, therefor.

Column 21
Line 20, Delete "Darocure" and insert -- Darocur --, therefor.
Line 38, Delete "1 L" and insert -- 1L --, therefor.
Line 41, Delete "Darocure" and insert -- Darocur --, therefor.
Line 61, Delete "Darocure" and insert -- Darocur --, therefor.